United States Patent [19]
Engelmann

[11] 3,951,935
[45] Apr. 20, 1976

[54] PROCESS FOR POLYMERIZING α-OLEFINES

[75] Inventor: Manfred Engelmann, Augsburg, Germany

[73] Assignee: Hoechst Aktiengesellschaft, Frankfurt am Main, Germany

[22] Filed: June 5, 1974

[21] Appl. No.: 476,584

[30] Foreign Application Priority Data
June 9, 1973 Germany............................ 2329641

[52] U.S. Cl............................. 526/129; 252/429 C; 252/431 R; 526/156; 526/157; 526/210; 526/348; 526/351
[51] Int. Cl.² ..................... C08F 4/02; C08F 10/06
[58] Field of Search .................... 260/93.7, 94.9 DA

[56] References Cited
UNITED STATES PATENTS
3,676,415   7/1972   Diedrich et al. ............ 260/94.9 DA
3,833,515   9/1974   Amtmann et al. ................. 260/429

FOREIGN PATENTS OR APPLICATIONS
1,929,863   12/1970   Germany..................... 260/94.9 DA
2,111,455   9/1972   Germany..................... 260/94.9 DA
1,314,198   4/1973   United Kingdom ......... 260/94.9 DA
1,560,467   2/1969   France ........................ 260/94.9 DA Primary Examiner—Edward J. Smith
Attorney, Agent, or Firm—Connolly and Hutz

[57] ABSTRACT

Essentially amorphous polyolefines of medium molecular weight are prepared by polymerization of α-olefines in the presence of a Ziegler supported catalyst. This catalyst consists of the reaction product of the chloride and/or alcoholates of the tetravalent titanium and of an alcoholate and/or a magnesium compound containing hydroxyl groups and of an aluminiumorganic compound containing chlorine, in which the proportion Al : Cl is 4:1 to 0.8:1. The polymerization is carried out at a temperature of from 100° to 160°C.

4 Claims, No Drawings

PROCESS FOR POLYMERIZING <-OLEFINES

The present invention relates to the polymerization of α-olefines — especially propylene — to obtain polymers of medium molecular weight.

For polymerizing propylene to obtain highly crystalline products it is known practice to use Ziegler-catalysts, especially on the basis of titanium-trichloride, as second component being used chlorine-containing aluminum-alkyles, especially diethyl-aluminum-monochloride so as to obtain a product as isotactic and crystalline as possible and to prevent the formation of atactic polypropylenes. Though the crystalline quality is clearly affected by the use of aluminum-triethyl, whilst the reaction speed is increasing considerably (cf., German "Offenlegungsschrift" No. 2,147,654), polypropylenes being prepared in such a way still contain important crystalline portions. The only processes for polymerizing propylene that became important in technology are those operating at temperatures below 100°C which lead to high-molecular, highly crystalline plastics.

In recent years a series of new, modified Ziegler-catalysts have been described, which comprise the reaction of magnesium compounds with titanium compounds. By means of these compounds it is possible to polymerize ethylene α-olefines with an addition of aluminium alkyles at a temperature below 100°C, the catalysts being particularly efficient in the case of using aluminiumorganic compounds free of halogen. The polymers thus produced are high-molecular.

The polymerization of ethylene while using such catalysts, at a temperature of from 110° to 180°C, has been described in the past (cf. German "Offenlegungsschrift" No. 1,929,863). Accordingly, polyethylenes having a relatively low molecular weight can be prepared with a considerable catalyst-yield, in the presence of hydrogen and, preferably, aluminiumorganic compounds free of halogen.

Under these conditions, the polymerization of propylene is comparatively insignificant and the products show low degrees of polymerization. Even in the absence of hydrogen, the use of said catalysts containing alkyls — free of halogen — at a temperature above 110°C results only in very low polymerization speeds.

In this way it is not possible to produce polypropylene of a medium polymerization degree with a catalyst yield of technical interest.

In the contrary, polymerization of propylene with high catalyst yield succeeds at a temperature above 100°C, if a special catalyst is used. The molecular weight of the polypropylene thus produced is below the usual range for plastic-like polymers and above the values generally attributed to wax.

Therefore the present invention is related to a process for the preparation of a polyolefine having a medium molecular weight by polymerization of at least one olefine of the formula R—CH=CH$_2$, R representing an alkyl radical having from 1 to 30 carbon atoms, as well as by copolymerization of at least one of these olefines with ethylene in the presence of a mixed catalyst consisting of a titanium-containing component (component A) and an aluminiumorganic compound (component B), wherein the polymerization is carried out at a temperature of from 100° to 160°C in the presence of a mixed catalyst, the component A of which is the reaction product of the chloride and/or an alcoholate of the tetravalent titanium and of an alcoholate and/or a magnesium compound containing hydroxyl groups and, optionally, of a chloride or alcoholate of silicon and/or of aluminum provided that the reaction system must include alkoxy groups and chlorine, and the component B of which is an aluminumorganic compound containing chlorine and hydrocarbon radicals in which the atomic proportion of Al : Cl is from 4:1 to 0.8:1.

According to the present invention α-olefines, especially propylene, can be polymerized to obtain polyolefines of medium molecular weight, with a good catalyst yield at a temperature above 100°C, whilst the aluminum-trialkyles free of halogen, being usually known as particularly polymerization-active, proved absolutely unsuitable to this purpose. However, the use — according to the invention — of chlorine-containing aluminum-alkyles, especially diethyl-aluminum-monochloride, leads to exceptionally active catalysts.

The polyolefines produced according to the invention, especially polypropylene, are essentially amorphous. The proportion from amorphous to crystalline or from atactic to isotactic can be influenced — within the given limits — in the product by varying the proportion of aluminum to chlorine in the aluminiumorganic component. Whilst, as already mentioned, the shifting of the atomic proportion Al : Cl of 1:1 in favor of aluminum, for example by addition of aluminum-triehtyl to the system titanium-trichloride diethyl-aluminum-monochloride results in a remarkable increase in amorphous low-molecular portions, the opposite effect appears under the conditions according to the present invention.

For example, polymers being prepared with an aluminum-organic component at the proportion of Al:Cl = 1:1, proved to be less crystalline than those which were formed upon a composition of the aliminumorganic component of Al:Cl = 2:1.

The density and the hardness are used here as a measure for the proportion atactic : isotactic or for the degree of crystallization.

The process according to the invention thus permits the preparation of poly-α-olefines of medium molecular weight, especially of polypropylenes which are characterized by the combination of the properties "viscous-elastic" and "relatively hard," this relation may be modified easily, depending on the use intended.

The mixed catalyst itself being used for the polymerization is well known. The titanium-containing component A is formed by a reaction between the chloride or an alcoholate of the tetravalent titanium or mixtures thereof with an alcoholate or a magnesium compound containing hydroxyl groups, optionally with a chloride or an alcoholate of aluminum and/or silicon.

Suitable titanium-alcoholates have the formula Ti(OR)$_4$, R may be identical or different alkyl radicals having from 1 to 6 carbon atoms, for example Ti(OC$_3$H$_7$)$_4$, Ti(OiC$_3$H$_7$)$_4$, Ti(OiC$_4$H$_9$)$_4$.

For preparing the component A use is made of magnesium alcoholates of the general formula Mg(OR)$_2$, wherein R means identical or different hydrocarbon radicals having from 1 to 10 carbon atoms; magnesium-alcoholates with alkyl radicals having from 1 to 4 carbon atoms, for example Mg(OCH$_3$)$_2$, Mg(OC$_2$H$_5$)$_2$, Mg(OiC$_4$H$_9$)$_2$, Mg-phenolate, are particularly preferred.

There may be used complex metal alcoholates such as Mg[Al(OiC$_3$H$_7$)$_4$]$_2$, Mg[Si(OC$_2$H$_5$)$_6$], too.

The magnesium compounds containing hydroxyl groups may contain, for example, nitrate, carbonate, sulfate or carboxylate — groups besides the OH-groups, preferably are used magnesium compounds containing OH-groups of from 0.5 – 2 mole of OH-groups per g/atom of magnesium.

Alkoxy groups and chlorine have to be introduced into the reaction via the reactants for preparing the catalyst component A. However, they may also be introduced into the system, optionally, by means of an addition of a chloride and/or an alcoholate of silicon or aluminum.

The aluminum alcoholates having the general formula $Al(OR)_3$ contain as R identical or different hydrocarbon radicals having from 1 to 6 carbon atoms, e.g. $Al(OC_2H_5)_3$, $Al(OiC_3H_7)_3$, $Al(OC_4H_9)_3$.

According to the invention further more $SiCl_4$ or alcoholates of silicon of the general formula $Si(OR)_4$, may be used, R representing identical or different hydrocarbon radicals, especially alkyl radicals having from 1 to 6 carbon atoms, e.g., $Si(OC_2H_5)_4$ and $Si(OiC_3H_7)_4$.

Generally, the preparation of the component A is done in an inert hydrocarbon as diluent or suspension agent, at a temperature of from 50° to 140°C. Most suitable are aliphatic or cycloaliphatic hydrocarbons, such as hexane, heptane, cyclohexane as well as aromatic hydrocarbons such as toluene, etc. It is useful to introduce at first the magnesium component as a suspension and to add the titanium compound — while agitating—, optionally in combination to or followed by the silicon compound or aluminum compound. Order and manner of the addition may vary, however.

The reaction time usually lasts from 1 to 10 hours. Then the component A is present as solid and is separated from soluble compounds by washing repeatedly with an inert hydrocarbon.

The molecular proportions of the reactants are usefully set in the range of magnesium compound to titanium compound to silicon or aluminum compound as 1 to 0.2 – 5 to 0.2 – 5, but polymerizations with catalysts prepared of mixtures outside this range are also possible.

Preferred combinations for preparing the component A are the following:

$Mg(OR)_2$ - $TiCl_4$
$Mg(OR)_2$ - $Ti(OR)_4$ - $SiCl_4$
$Mg(OH)_2$ - $Ti(OR)_4$ - $SiCl_4$
$Mg(OH)_2$ - $TiCl_4$ - $Al(OR)_2$

Most preferred of them are $Mg(OR)_2$ - $TiCl_4$.

It is also possible to use a mixture of a magnesium alcoholate and a magnesium compound containing hydroxyl groups or a mixture of titanium tetrachloride and a titanium tetraalcoholate.

Usually, the component A — calculated on the fixed titanium— is applied at a concentration rating from 0.1 to 5 mMole, preferably from 0.3 to 2 mMole, per liter of solvent.

As component B is used an aluminumorganic compound containing chlorine and hydrocarbon radicals, preferably alkyl radicals having from 2 to 12 carbon atoms.

The atomic proportion Al : Cl should be from 4 : 1 to 0.8 : 1, preferably within the range of from 2 : 1 to 1 : 1. Accordingly, the component B is accessible directly in the form of aluminum-diethyl-monochloride or it is prepared by blending several aliminumorganic compounds of different chlorine content.

Suitable blending components are chlorine-containing aluminium alkyles or those free of chlorine, such as aluminum trialkyles, aluminum dialkyl-hydrides, aluminum sesquichlorides, etc., for example, aluminum triethyl, aluminum monoethyldichloride, aluminum diisobutyl-hydride, etc.

Special preference is given to the use of aluminum diethyl-monochloride.

The concentration of component B during polymerization is in the range of from 1 to 20 mMole/l of solvent and amounts, preferably, to from 3 to 10 mMole/1.

The polymerization may be carried out continuously or — as well — discontinuously. The component B is prepared prior to polymerization by blending the corresponding aluminum compounds. However, it is also possible and, eventually, advantageous to modify during polymerization the proportion between chlorine and aluminum by adding a suitable aluminumorganic compound of a different composition.

The polymerization according to the invention is carried out in solution at a temperature of from 100° to 160°C, preferably from 115° to 140°C. As solvents are applied inert hydrocarbons, in analogy to the preparation of the catalyst. However, it is also possible and, in some cases, particularly advantageous to realize the polymerization in inert hydrocarbons such as paraffines which are liquid at the polymerization temperature, but solid at room temperature.

A polymerization can also be carried out in liquid monomers.

The polymerization pressure generally reaches maximum 20 kg/cm² and ranges, preferably, from 2 to 10 kg/cm².

The molecular weight may be controlled in known manner, e.g., by the addition of small quantities of hydrogen. The molecular weight is also influenced by the polymerization temperature, the pressure and the composition of the catalyst components A and B. The polymerization is preferably carried out in absence of hydrogen.

At least one olefine of the formula $R-CH=CH_2$ is used as monomer, R representing an alkyl radical having from 1 to 30 carbon atoms. Special preference is given to the polymerization of propylene.

Furthermore, it is possible to use mixtures of these olefines with ethylene.

The "catalyst yield" — calculated on the titanium used in the catalyst — at 5 kg/cm² and with propylene as monomer amounts already to up to 800 g of polymer/mMole of titanium or to 3 kg or more of product/g of magnesium compound used for preparing the catalyst.

On the other hand, in the case of using for a specific polymerization aluminum alkyls free of halogen, such as aluminum triethyl, the result obtained shows only minor polymerization activities and catalyst yields below 50 g/mMole of titanium.

The high catalyst yields obtainable by means of the mode of operation according to the present invention are particularly of technical interest because they simplify or possibly avoid processing steps such as catalyst decomposition and separation.

The solvent is, optionally, separated by distillation; in case of products having a higher degree of viscosity this separation is performed usefully in a film evaporator device.

The polyolefines prepared according to the process of the present invention are products from relatively hard to soft, tough-elastic to tacky — depending on the conditions of the preparation — within a viscosity range of from abt. 100 to 100,000 cP, measured at 170°C. The values for the relative specific viscosity, measured at 135°C in decahydronaphthalene, keep within a range of from abt. 0.3 to 1 and thus they are far below the standard for commercial polypropylenes.

The products obtained according to the invention are suitable, for example, for sealable coatings and for adhesive formulations. The following examples illustrate the process of invention:

EXAMPLE 1 a. Preparation of the supported catalyst 171 g of magnesium ethylate are suspended in 1,000 ml of a diesel oil fraction within the boiling range of from 140° – 160°C and, while stirring at 100°C, 330 ml of titanium tetrachloride, dissolved in 400 ml of the a.m. diesel oil, are added dropwise; subsequently, the deposit is washed by decanting and renewed stirring with diesel oil until the diesel oil supernatant the solid is free from titanium compounds.

The titanium content of the suspension is determined by colorimetry with hydrogen peroxide. Abt. 12 % of the titanium used are fixed onto the solid.

b. polymerization of propylene 15 ltr. of a diesel oil fraction having a boiling range from 140° – 160°C are introduced into a 50 l vessel equipped with an impeller agitator, and at a temperature of 135°C are added 100 mMole of aluminum diethyl monochloride [$Al(C_2H_5)_2Cl$] and 60 ml of the a.m. catalyst suspension (corresponding to 20 mMole of fixed titanium). Subsequently, gaseous propylene is introduced. The interior temperature is maintained at 135°C. After 4 hours the pressure has raised to 5 kg/cm². Then the reaction is interrupted by addition of a small quantity of water or steam, the polymer solution is separated from the disactivated catalyst by filtration and, subsequently, the solvent is eliminated by vacuum distillation.

8.1 kg of a polypropylene having a melting viscosity of 5,100 cP, measured at 170°C remain. The catalyst yield, i.e., the quantity of polymerizate obtained per mMole of titanium, thus amounts to approx. 400 g/mMole. The ball indentation hardness is below 100 (DIN 53456), the shore hardness A being 75, the density being 0.867 g/cm³, measured at 23°C. By extraction with boiling petroleum ether 75% may be separated. The product is viscous and highly elastic.

c. Comparative experiment

Under the conditions corresponding to those of the aforedescribed polymerization aluminum, triethyl ($Al(C_2H_5)_3$) replaces $Al(C_2H_5)_2Cl$.

The maximum pressure of 5 kg/cm² can only be maintained by extreme reduction of the gas supply. After separation of the solvent, a residue of abt. 580 g of polypropylene remains corresponding to a catalyst yield of merely 29 g/mMole of titanium. The product is considerably more brittle than the polypropylene prepared according to the invention.

EXAMPLE 2 a. Preparation of the supported catalyst 69 g of magnesium ethylate are suspended in 800 ml of diesel oil, and 176 ml of titanium tetraisopropylate being added at 80°C. A solution of 68 ml of silicon tetrachloride, diluted with 200 ml of diesel oil, are added dropwise in course of 1 hour to this mixture, while stirring. Subsequently, the reaction mixture is stirred for additional 4 hours at 80°C and, finally, the deposit is washed by decanting and further stirring with diesel oil until the diesel oil supernatant the solid is free of titanium compounds.

A suspension of 950 ml contains 215 mMole of titanium, corresponding to a fixed quantity of 35%.

b. Polymerization of propylene

The experiment is performed by analogy to Example 1.

150 mMole of $Al(C_2H_5)_2Cl$ are introduced into the reaction vessel and 84 ml of the a.m. suspension, corresponding to 19 mMole of titanium added. Propylene is supplied at a temperature of 130°C. After 3 hours and upon attaining 5 kg/cm² the experiment stopped.

5.6 Kg of polypropylene are obtained having a melt viscosity of 19,000 cP, measured at 170°C. The product is viscous and elastic. The shore hardness A amounts to 85.

c. Comparative experiment 1 ltr. of diesel oil, 10 mMole of $Al(C_2H_5)_3$ and 8.9 ml of the a.m. catalyst suspension (corresponding to 2 mMole of titanium) are blended at 130°C in a glass autoclave having a volume of 2 ltr., 6 kg/cm² of propylene are added under pressure and this pressure being maintained by adding supplementary doses of propylene.

The reaction is stopped after 2 hours. The yield is approx. 35 g of polymer, corresponding to 17.5 g/mMole of the titanium contained in the catalyst.

EXAMPLE 3 (Comparative examples)

Polymerization of propylene at 70°C

After having introduced 1 ltr. of diesel oil into an autoclave of a volume of 2 ltrs., 10 mMole of $Al(C_2H_5)_3$ and 3 ml of a catalyst suspension prepared according to example 1 (titanium content 1 mMole) are added and, at a temperatue of 70°, propylene is fed in. The process of polymerization can be supervised by observing the exothermic reaction. So as not to surpass the temperature of 70°C, the inlet gas has to be brought down to and maintained at 3 kg/cm².

The polymerization is stopped after 30 minutes. The result is a suspension of polypropylene in the heavily stringy suspending agent. The yield amounts to approx. 150 g.

A parallel experiment uses $Al(C_2H_5)_2Cl$ instead of $Al(C_2H_5)_3$, the rest of the conditions remaining unaltered.

The slow path of the polymerization, recognizable by the low development of heat enables to increase the pressure to 6 kg/cm².

Nevertheless, the yield is only approx. 60 g in this case.

EXAMPLE 4

Polymerization of propylene

Equipment and catalyst component A correspond to example 1.

After having introduced 15 ltr. of diesel oil, 100 mMole of diehtyl monochloride and 15 mMole of the contact component A are added at 115°C and propylene is fed in at the rate of approx. 2.4 kg per hour. After abt. 1 ½ hour a pressure of 5 kg/cm² is attained which is maintained constantly for the next 30 minutes.

Subsequently, deactivation takes place by steam and by separating the residues of the catalyst and of the solvent.

4.2 kg of polypropylene having a melt viscosity of 51,000 cP/170°C and a shore hardness A of 91 are obtained. The density amounts to 0.875 g/cm$^3$.

EXAMPLE 5

Polymerization of propylene

Equipment and catalyst component A correspond to example 1.

After introduction of 15 l of diesel oil, 100 mMole of Al(C$_2$H$_5$)$_2$Cl and 10 mMole — calculated on the fixed titanium — of the catalyst component A are added at 150°C. Subsequently, propylene is fed in up to a pressure of 6 kg/cm$^2$ which is then maintained constant by dosing suitably the inlet gas.

The polymerization is stopped after 2 hours. 1,600 g of polypropylene having a melt viscosity of 5,040 cP, measured at 170°C, are obtained. The shore hardness A is 62.

EXAMPLE 6

Polymerization of propylene

Equipment and catalyst component A correspond to example 1. 15 ltr. of diesel oil are introduced first. After addition of 67 mMole of Al(C$_2$H$_5$)$_2$Cl, 33 mMole of Al(C$_2$H$_5$)$_3$ and 10 mMole — calculated on titanium — of the catalyst component A at 130°C, propylene (2.4 kg/h) is fed in. After 2 ¼ hours the pressure raises to 5 kg/cm$^2$, the polymerization then being interrupted. A yield of 4.8 kg of polypropylene is obtained, having a melt viscosity of 18,000 cP/170°C and a shore hardness A of 90. The density, measured at 23°C, is 0.877 g/cm$^3$.

EXAMPLE 7

Polymerization of propylene

Into a 50 ltr. vessel with impeller agitator there are introduced 15 l of diesel oil, 10 mMole of Al(C$_2$H$_5$)$_2$Cl and 10 mMole of Al(C$_2$H$_5$)$_3$. Subsequently, propylene is fed in up to a pressure of 5 kg/cm$^2$, the gas supply is then adjusted to 2.4 kg/h. A pressure of 5 kg/cm$^2$ being attained, the addition of a mixture of 2 l of diesel oil, 50 mMole of Al(C$_2$H$_5$)$_2$Cl, 50 mMole of Al(C$_2$H$_5$)$_3$ and 20 mMole (calculated on fixed titanium) of a catalyst component A prepared according to example 1 is started. The dosing speed is adjusted in such a way that the pressure remains contant at 5 kg/cm$^2$. The polymerization temperature is 135°C.

After 2 ¼ hours the batch is deactivated by means of steam. Up to this moment 930 ml of the catalyst suspension have been pumped in.

The yield obtained is 5.2 kg of polypropylene having a melt viscosity of 28,000 cP, measured at 170°C. The shore hardness A is 94, the density — measured at 23°C — is 0.877 g/cm$^3$.

The ball indentation hardness (DIN 53,456) at 110 kg/cm$^2$ is clearly superior to that of other corresponding experiments without an addition of Al(C$_2$H$_5$)$_3$. By extraction with boiling petroleum ether (boiling point 40° - 70°C) 53% can be separated.

EXAMPLE 8 (Comparative example)

Equipment and catalyst component A correspond to example 1. 66 mMole of Al(C$_2$H$_5$)$_2$Cl and 33 mMole of ethyl-aluminum sesquichloride are at first introduced into 15 l of diesel oil and, at 135°C, 10 mMole of catalyst (calculated on fixed titanium) are added. A quantity of approx. 2,4 kg/h of propylene is fed in, the pressure raises to 5.3 kg/cm$^2$ after abt. 15 minutes. So as to avoid a further pressure increase, the gas supply has to be reduced to approx. 250 g/h. Even a supplementary dose of aluminumorganic compound of the same composition does not bring about any improvement.

Thus the activity of the catalyst when using the aforesaid aluminumorganic compound is lower than that obtained according to the present invention.

EXAMPLE 9

Polymerization of propylene

Equipment and catalyst component A correspond to example 1. After first introducing 15 l of diesel oil and 50 mMole of Al(C$_2$H$_5$)Cl the temperature is adjusted to 120°C and an interior pressure of 13 kg/cm$^2$ built up by supplying propylene.

A mixture of 1 ltr. of Diesel oil, 50 mMole of Al(C$_2$H$_5$)$_2$Cl and 10 mMole of the catalyst component A (calculated on the fixed titanium) is prepared in a storage vessel equipped with an agitator; subsequently, this mixture is pumped little by little into the polymerization vessel, the dosage speed being chosen at such a rate that the pressure in the vessel is remaining constant at 13 kg/cm$^2$, while 1.5 kg of propylene p/hour are fed in simultaneously. After 2 hours the addition of catalyst and monomer is terminated and the drop of the pressure to 4 kg/cm$^2$ as a result of the proceeding polymerization awaited.

The batch is worked up as usual.

The yield is 4.3 kg; the catalyst component A added in doses contains 4.3 mMole of titanium.

The polypropylene has a melt viscosity of 56,000 cP/170°C.

EXAMPLE 10 a. Preparation of the supported catalyst 52.6 g of magnesium hydroxide are ground and suspended in 800 ml of diesel oil.

245 g of aluminum isopropylate are added and subsequently 82.7 ml of titanium tetrachloride — diluted with 400 ml of diesel oil — are added dropwise in course of 4 hours while stirring at 95°C.

Stirring is continued at 95°C for another half-hour, the solid is washed by repeated decanting and renewed suspension with diesel oil until the supernatant suspension agent is free of titanium.

The quantity of fixed titanium, calculated on the titanium tetrachloride used, is 29%.

b. polymerization of propylene 5 mMole of Al(C$_2$H$_5$)$_2$Cl and 8 ml of the a.m. catalyst suspension, corresponding to 1 mMole of fixed titanium, are added to 500 ml of diesel oil first introduced into a 1 ltr. glass autoclave.

Subsequently, propylene is added under pressure attaining 6 kg/cm$^2$ and this pressure is maintained constant at this level by adding further doses of propylene. The addition of more Al(C$_2$H$_5$)$_2$Cl increases the polymerization speed.

After 2 hours 189 g of polypropylene having a relative, specific viscosity of 0.65 dl/g are obtained.

EXAMPLE 11

Copolymerization of propylene and ethylene

Equipment and catalyst component A correspond to example 1.

After introducing first 15 l of diesel oil, ethylene is fed in until a pressure of 1 kg/cm$^2$ is attained and, subsequently, propylene is added under pressure so as to achieve a total pressure of 5 kg/cm$^2$.

The temperature is adjusted to 120°C and maintained at this constant level.

A mixture of 1 ltr. of diesel oil, 75 mMole of Al(C$_2$H$_5$)$_2$Cl and 10 mMole of the catalyst component A (calculated on the fixed titanium) is pumped in little by little and simultaneously added 1.5 kg/h of a mixture of propylene and ethylene (22 wt.% of ethylene).

The catalyst mixture is dosed according to the absorption of monomer and adjusted so as to maintain a constant pressure level of 5 kg/cm$^2$.

The reaction is stopped after 3 hours and the copolymer is separated. Up to this moment a total of 480 ml of catalyst mixture has been pumped in.

The yield is 4.5 kg — corresponding to 940 g of copolymer/mMole of titanium.

The melt viscosity is 100,000 cP/170°C, the shore hardness A is 16. The product obtained is very flexible and relatively soft, having a density of 0.856 g/cm$^3$ — measured at 20°C.

EXAMPLE 12

Polymerization of butene 1 ltr. of diesel oil is heated to 130°C in a 2 ltr.-glass autoclave. After addition of 10 mMole of Al(C$_2$H$_5$)$_2$Cl and of the catalyst component A — as described in example 1 — in an amount corresponding to 2 mMole of titanium, butene is added under pressure up to max. 2.3 kg/cm$^2$ and this level is maintained constant by adding supplementary doses of butene. The polymerization starts immediately. By adding small supplementary doses of Al(C$_2$H$_5$)$_2$Cl during the reaction, the polymerization speed be increased even more.

The reaction is stopped after 3½ hours and the solvent separated from the batch.

The yield obtained is 315 g, the relative specific viscosity being 0.45 dl/g — measured at 135°C in decahydronaphthalene. The polybutene is elastic and relatively soft.

EXAMPLE 13

Polymerization of octene 200 ml of octene-(1) are first introduced into a 500 ml-flask equipped with agitator and 10 mMole of Al(C$_2$H$_5$)$_2$Cl and 3 ml of the catalyst suspension according to example 1 — corresponding to 1 mMole of titanium, are added at 120°C. The polymerization starts immediately and the octene begins to boil. Some minutes later the batch becomes viscous.

The reaction is interrupted after 60 minutes; at that point 14 ml of octene can be separated by distillation, corresponding to a conversion rate of approx. 93%. The product is soft and sticky and has a relative specific viscosity of 1 dl/g — measured at 135° C in decahydronaphthalene.

What is claimed is:

1. A process for preparing a polyolefin having a melt viscosity of from 100 to 100,000 cP at 170°C by polymerization of at least one olefin having the formula R—CH=CH$_2$, wherein R is alkyl of from 1 to 30 carbon atoms, in the presence of a mixed catalyst consisting of a titanium-containing compound (component A) and of an aluminumorganic compound (component B), wherein the polymerization is carried out in the absence of hydrogen at a temperature of from 100° to 160° C in the presence of a mixed catalyst the component A of which represents the reaction product of from 0.2 to 5 moles of a member selected from the group consisting of chlorides and alcoholates of tetravalent titanium and of 1 mole of a member selected from the group consisting of alcoholates and OH-groups containing magnesium compounds containing from 0.5 to 2 moles of OH-groups per g-atom magnesium, alkoxy groups and chlorine being present in the reaction system and component B being an aluminum alkyl chloride in which the proportion of Al : Cl is from 2 : 1 to 1 : 1.

2. Process according to claim 1 wherein propylene is polymerized.

3. Process according to claim 1, wherein the polymerization is carried out at a temperature of from 115° to 140°C.

4. The process according to claim 1, wherein the polymerization is carried out in the presence of a mixed catalyst the component A of which represents the reaction product of from 0.2 to 5 moles of a member selected from the group consisting of chlorides and alcoholates of tetravalent titanium, 1 mole of a member selected from the group consisting of alcoholates and OH-groups containing magnesium compounds containing from 0.5 to 2 moles of OH-groups per g-atom magnesium and from 0.2 to 5 moles of a member selected from the group consisting of chlorides of silicon, alcoholates of silicon, chlorides of aluminum, alcoholates of aluminum and mixtures thereof, alkoxy groups and chlorine being present in the reaction system.

* * * * *